(12) United States Patent
Saigusa

(10) Patent No.: US 8,829,382 B2
(45) Date of Patent: Sep. 9, 2014

(54) MACHINE TOOL

(75) Inventor: Yoshinori Saigusa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/239,318

(22) PCT Filed: Oct. 14, 2011

(86) PCT No.: PCT/JP2011/073682
§ 371 (c)(1),
(2), (4) Date: Feb. 18, 2014

(87) PCT Pub. No.: WO2013/054443
PCT Pub. Date: Apr. 18, 2013

(65) Prior Publication Data
US 2014/0209570 A1 Jul. 31, 2014

(51) Int. Cl.
*B23H 11/00* (2006.01)
*B23Q 1/01* (2006.01)
*B23H 1/00* (2006.01)

(52) U.S. Cl.
CPC ............. *B23H 11/00* (2013.01); *B23Q 1/015* (2013.01); *B23H 1/00* (2013.01)
USPC ........................................... 219/69.11

(58) Field of Classification Search
CPC ........... B23H 11/00; B23Q 1/01; B23Q 11/10
USPC ............................................. 219/69.11–69.2
See application file for complete search history.

(56) References Cited

U.S. PATENT DOCUMENTS

| | | | | |
|---|---|---|---|---|
| 5,290,987 A | * | 3/1994 | Davis et al. | 219/69.11 |
| 5,736,015 A | * | 4/1998 | Armentrout et al. | 204/224 M |
| 7,202,439 B2 | * | 4/2007 | Ishiwata et al. | 219/69.14 |

FOREIGN PATENT DOCUMENTS

| | | |
|---|---|---|
| JP | 59-30607 U | 2/1984 |
| JP | 59-192426 A | 10/1984 |
| JP | 61-163121 U | 10/1986 |
| JP | 2-137072 U | 11/1990 |
| JP | 4-331010 A | 11/1992 |
| JP | 5-1502 U | 1/1993 |
| JP | 6-246561 A | 9/1994 |
| JP | 7-60617 A | 3/1995 |
| JP | 2000-24851 A | 1/2000 |
| JP | 2002-248902 A | 9/2002 |

(Continued)

OTHER PUBLICATIONS

International Search Report for PCT/JP2011/073682 dated Jan. 17, 2012.

*Primary Examiner* — Samuel M Heinrich
(74) *Attorney, Agent, or Firm* — Sughrue Mion, PLLC

(57) ABSTRACT

A machine tool includes a bed, an electric-discharge machining unit that is mounted on the bed and constitutes a machine main body, a frame that has a mounting surface and is fixed to a side surface of the bed, machining fluid tanks that are used when the electric-discharge machining unit is operated to performs a machining work, and are set to the first state where these tanks are above the frame and separated from the mounting surface so as to be self-supported, or to the second state where these tanks are mounted on the mounting surface, and a transport fixing tool that is removed when the machining fluid tanks are set to the first state, and is attached when the machine main body and the machining fluid tanks are set to the second state.

4 Claims, 5 Drawing Sheets

(56) References Cited

FOREIGN PATENT DOCUMENTS

| | | |
|---|---|---|
| JP | 2003-300122 A | 10/2003 |
| JP | 2005-127455 A | 5/2005 |
| JP | 2007-284069 A | 11/2007 |
| JP | 2009-136973 A | 6/2009 |

* cited by examiner

MACHINE TOOL

CROSS REFERENCE TO RELATED APPLICATIONS

This application is a National Stage of International Application No. PCT/JP2011/073682 filed Oct. 14, 2011, the contents of which are incorporated herein by reference in their entirety.

FIELD

The present invention relates to a machine tool.

BACKGROUND

Conventionally, there has been a concept of a machine configuration in which, at the time of transporting a machine tool, units as relatively light-weighted accompanying devices such as a cooling unit, a hydraulic unit, and a coolant tank are fixed to a machine main body, and these units are detached from the main body by removing fixing tools after installation of the machine tool, thereby avoiding influences of pump vibrations and generated heat on the main body.

For example, Patent Literature 1 discloses a configuration in which, when a machine tool is transported, units such as a cooling controller and a hydraulic unit are fixed to a bed by fixing tools, and after installation of the machine tool, the fixing tools are removed and respective units are separated from the bed and are installed independently. Patent Literature 2 discloses a technique in which, when a machine tool is transported, a light-weighted chute unit, which is a part of a coolant tank and collects cut chips, is separated and fixed to a bed of the machine tool, thereby reducing a transporting space.

CITATION LIST

Patent Literatures

Patent Literature 1: Japanese Patent Application Laid-open No. 2003-300122
Patent Literature 2: Japanese Patent Application Laid-open No. 2009-136973

SUMMARY

Technical Problem

However, like Patent Literatures 1 and 2 mentioned above, in the conventional techniques, units fixed to a bed at the time of transport are limited to be small units because these units are directly fixed to the bed by using fixing tools. Furthermore, when a large unit is directly fixed to the bed by fixing tools, it is required to increase the rigidity of the unit itself more than necessary only for fixing the unit at the time of transport, and thus there is a problem of cost increase accompanied by this requirement, that is, only for the fixing of the unit at the time of transport.

The present invention has been achieved in view of the above problems, and an object of the present invention is to provide a machine tool that is capable of transporting large-sized accompanying devices with a bed in an integrated manner and separating these devices from the bed when the machine tool is installed.

Solution to Problem

In order to solve the aforementioned problems, a machine tool according to one aspect of the present invention is configured to include: a bed; a machining device that is mounted on the bed and constitutes a machine main body with the bed; a frame that has a mounting surface and is fixed to the side surface of the bed; accompanying devices that are used when the machining device performs a machining work, and are set to a first state where these devices are above the frame and separated from the mounting surface so as to be self-supported or to the second state where these devices are mounted on the mounting surface; a fixing member that is attachable and fixes the accompanying devices mounted on the mounting surface of the frame to the frame, wherein when the machining device is operated, the accompanying devices are set to the first state and the fixing member is removed, and when the machine main body and the accompanying devices are moved, the accompanying devices are set to the second state and the fixing member is attached.

Advantageous Effects of Invention

According to the machine tool of the present invention, because the machine tool can be moved without detaching wires, pipes or the like that connect accompanying devices and a machining apparatus, the time to be consumed for moving the machine tool can be significantly reduced.

DESCRIPTION OF EMBODIMENTS

Exemplary embodiments of a machine tool according to the present invention will be explained below in detail with reference to the accompanying drawings. The present invention is not limited to the embodiments.

Embodiment

Figure 1:
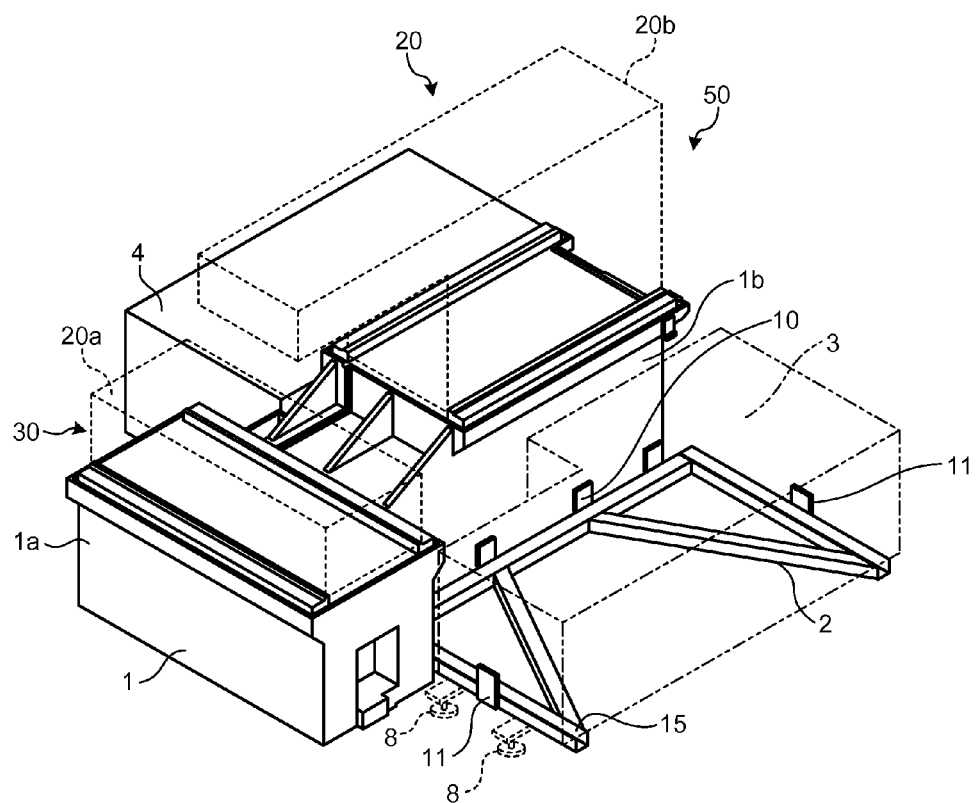
FIG. 1 is a perspective view of a machine tool according to an embodiment of the present invention.
Figure 2:
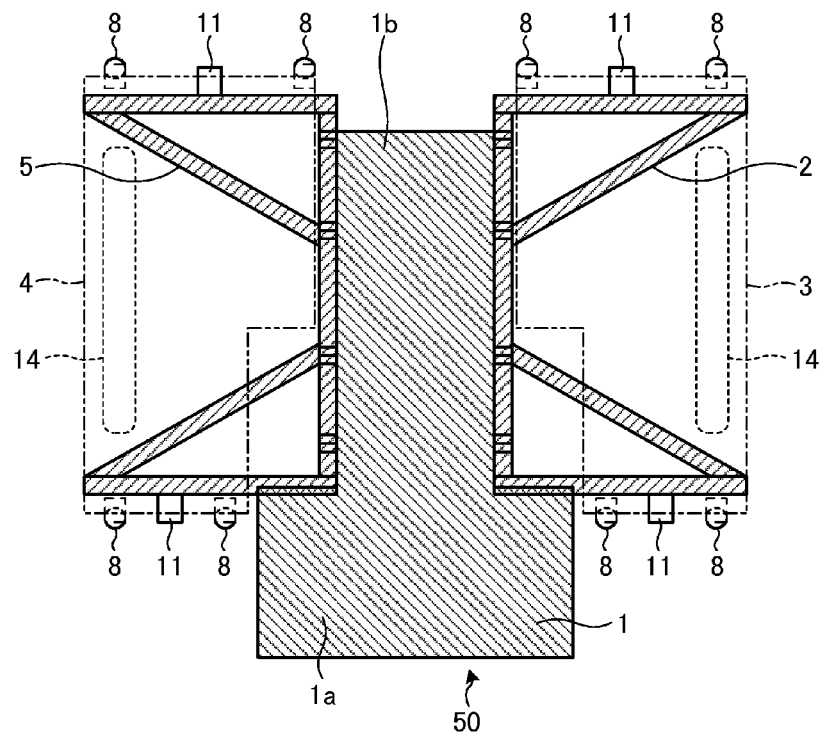
FIG. 2 is a top view of the machine tool.
Figure 3:
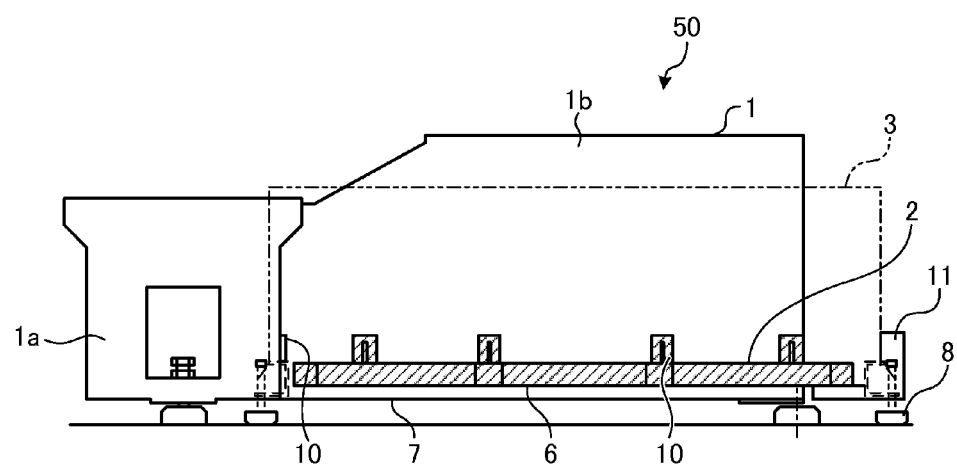
FIG. 3 is a side view of the machine tool.

FIG. 1 is a perspective view of a machine tool according to an embodiment of the present invention. FIG. 2 is a top view of the machine tool. FIG. 3 is a side view of the machine tool. In FIGS. 2 and 3, only a lower portion of a machine tool 50 is shown. The machine tool 50 includes a bed 1, frames 2 and 5, machining fluid tanks 3 and 4, and FIG. 1 depicts a state where these elements are assembled. The bed 1 is a table that constitutes a machine main body 30 of the machine tool 50 and has a guiding surface. For example, the bed is a cast formed by casting. An electric-discharge machining unit 20 as a machining device that constitutes the machine main body 30 of the machine tool 50 with the bed 1 and machines a workpiece is mounted on the bed 1. The electric-discharge machining unit 20 includes a machining tank 20a and a column 20b. The machining tank 20a is mounted on a horizontal portion 1a that is positioned on a front side of the bed 1, and the column 20b is mounted on a vertical portion 1b that is positioned on a rear side of the bed 1. The arrangement of the machining tank 20a and the column 20b with respect to the horizontal portion 1a and the vertical portion 1b, respectively, is only an example, and layouts different from the example can be also employed. The machining fluid tanks 3 and 4 are units as accompanying devices to be used when the electric-discharge machining unit 20 machines a workpiece. The frames 2 and 5 have a mounting surface 15 that can mount machining fluid tanks 3 and 4. The machining fluid tanks 3 and 4 have extendable legs 8 and are arranged above the frames 2 and 5, respectively. By extending and contracting the legs 8, the machining fluid tanks 3 and 4 are either in a first state where these tanks are above the frames 2 and 5 and separated from the mounting surface 15 so as to be self-supported or in a second state where these tanks are mounted on the mounting surface 15.

The frames 2 and 5 are fixed by bolts (not shown) on right and left side surfaces of the bed 1. When the machine tool is transported, the machining fluid tanks 3 and 4 are fixed to the frames 2 and 5 by transport fixing tools 11, which serve as fixing members. When the machining fluid tanks 3 and 4 are fixed to the frames 2 and 5, the machining fluid tanks 3 and 4 are set to the second state by contracting the legs 8 and are mounted on the mounting surface 15. When the machine tool is installed, in order to prevent vibrations and heat of pumps (not shown) mounted on each of the machining fluid tanks 3 and 4 from being transmitted to the machine main body 30, the transport fixing tools 11 are removed, the machining fluid tanks 3 and 4 are set to the first state by extending the legs 8, and these tanks are separated from the frames 2 and 5. By removing the transport fixing tools 11 and extending the legs 8, the machining fluid tanks 3 and 4 are set to a state where these tanks are physically separated from the frames 2 and 5 so as to be self-supported with the legs 8, and therefore the vibrations and heat are not transmitted to the bed 1 from the machining fluid tanks 3 and 4 through the frames 2 and 5. The shape and attaching positions of the transport fixing tools 11 are not limited to the example shown in the drawings, and it is also possible to apply a configuration in which the legs 8 of the machining fluid tanks 3 and 4 and the frames 2 and 5 are fixed by the transport fixing tools 11. By having a configuration such that the legs 8 and the frames 2 and 5 are fixed, it becomes possible to fix the machining fluid tanks 3 and 4 to the frames 2 and 5 without increasing the rigidity of the machining fluid tanks 3 and 4.

The frames 2 and 5 with a sufficient rigidity are respectively fixed to the right and left side surfaces of the bed 1, and as the frames 2 and 5 function as structural bodies, these frames can contribute to the rigidity improvement in a twisting direction of the front and rear sides of the bed 1. Furthermore, by fixing the frames 2 and 5 to side surfaces of the bed 1, the dimension of the bed 1 in a height direction can be sufficiently secured, and therefore a higher rigidity of the bed itself can be secured as compared to, for example, a case where frames are fixed to a lower surface of a bed. When the bed 1 has a horizontally-long shape, the rigidity in a twisting direction of the right and left sides of the bed 1 can be improved by fixing the frames 2 and 5 to the front and rear side surfaces.

Furthermore, in the illustrated example, the bed 1 has a T-shape, and therefore, as the shape of the frames 2 and 5, by providing fixing parts 10 in each of the horizontal portion 1a and the vertical portion 1b, further rigidity improvement in the twisting direction of the front and rear sides of the bed 1 can be realized. That is, by fixing the frames 2 and 5 to both of the side surface of the horizontal portion 1a and the side surface of the vertical portion 1b, the rigidity of the bed 1 in the twisting direction can be further improved.

As shown in FIG. 2, the shape of the frames 2 and 5 is set to be a shape such that a central part of the front and rear sides of these frames forms a V-shape. The V-shape is formed in consideration of the assemblability of the frames 2 and 5, and formed such that structural members or braces are not positioned on a side opposite to the side on which they are fixed to the bed 1 near the central part in the longitudinal direction of the bed, and a space 14 is formed in a central part at a side opposite to the bed 1, thereby facilitating insertion of transport tools or the like (forks of a forklift, for example) that lift the machining fluid tanks 3 and 4 from the right and left sides of the bed 1, which is assembled with the frames 2 and 5. Furthermore, the central part of the front and rear sides of the frames 2 and 5 can also form a U-shape. When the machining fluid tanks 3 and 4 themselves have a lifting configuration (such as holes through which a wire or a rope passes), or when lifting tools (such as eye bolts) can be mounted on the machining fluid tanks 3 and 4 and these tanks are lifted by a hoist or the like for loading on or unloading from the frames 2 and 5, it is possible to apply a configuration in which structural members or braces are positioned on the side opposite to the side on which they are fixed to the bed 1 near the central part in the longitudinal direction.

As shown in FIG. 3, by having a configuration in which a lower surface position 6 of the frames 2 and 5 is arranged above a bottom surface 7 of the bed 1, when the machine main body 30 is lifted by a forklift or the like at the time of moving it, the machine main body 30 can be lifted while forks of the forklift do not interfere with the frames 2 and 5.

By securing a sufficient rigidity of the frames 2 and 5, the machine tool 50 can be moved into a state where the machining fluid tanks 3 and 4 having fluid filled therein are fixed to the frames 2 and 5. With this configuration, the moving of the machine tool 50 can be performed without removing wires, pipes or the like that connect the machining fluid tanks 3 and 4 and the electric-discharge machining unit 20, thereby significantly reducing the time for moving the machine tool 50.

Furthermore, by setting the weights of the frames 2 and 5 with respect to the bed 1 and the machining fluid tanks 3 and 4 symmetrically the same, there will be no problem in the weight balance of these units at the time of lifting the machine main body 30.

Figure 4:
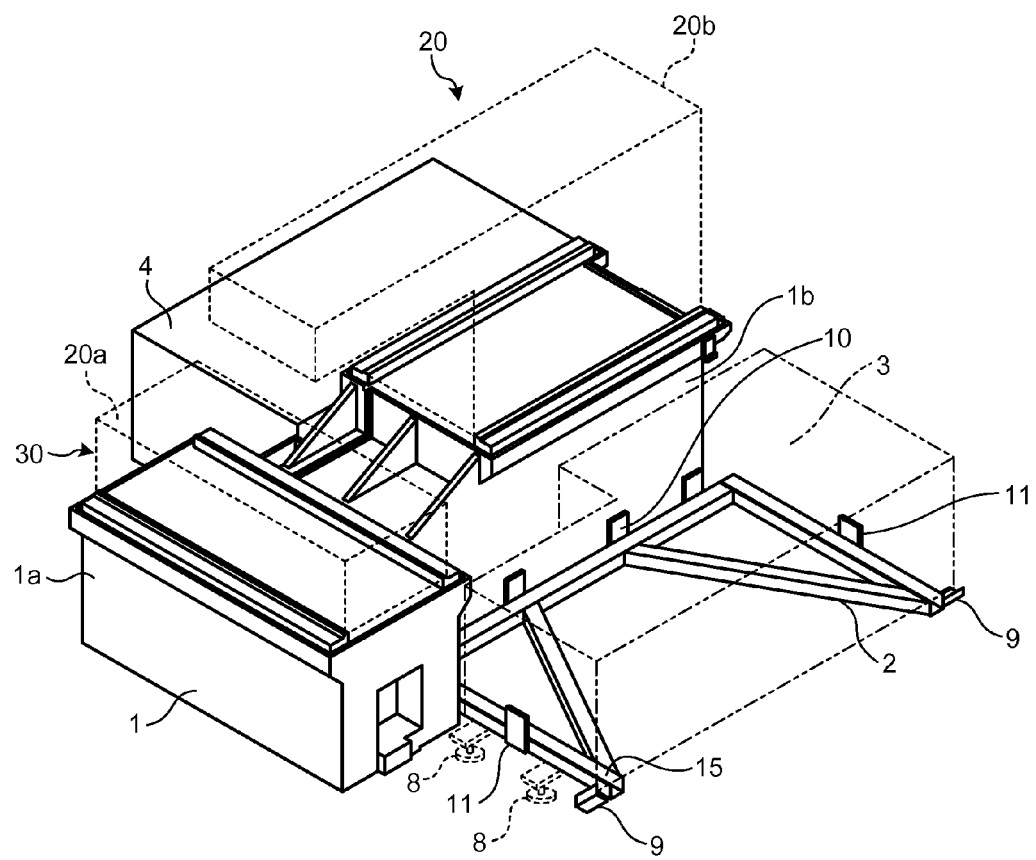
FIG. 4 is a perspective view of an example of another configuration of the machine tool.
Figure 5:
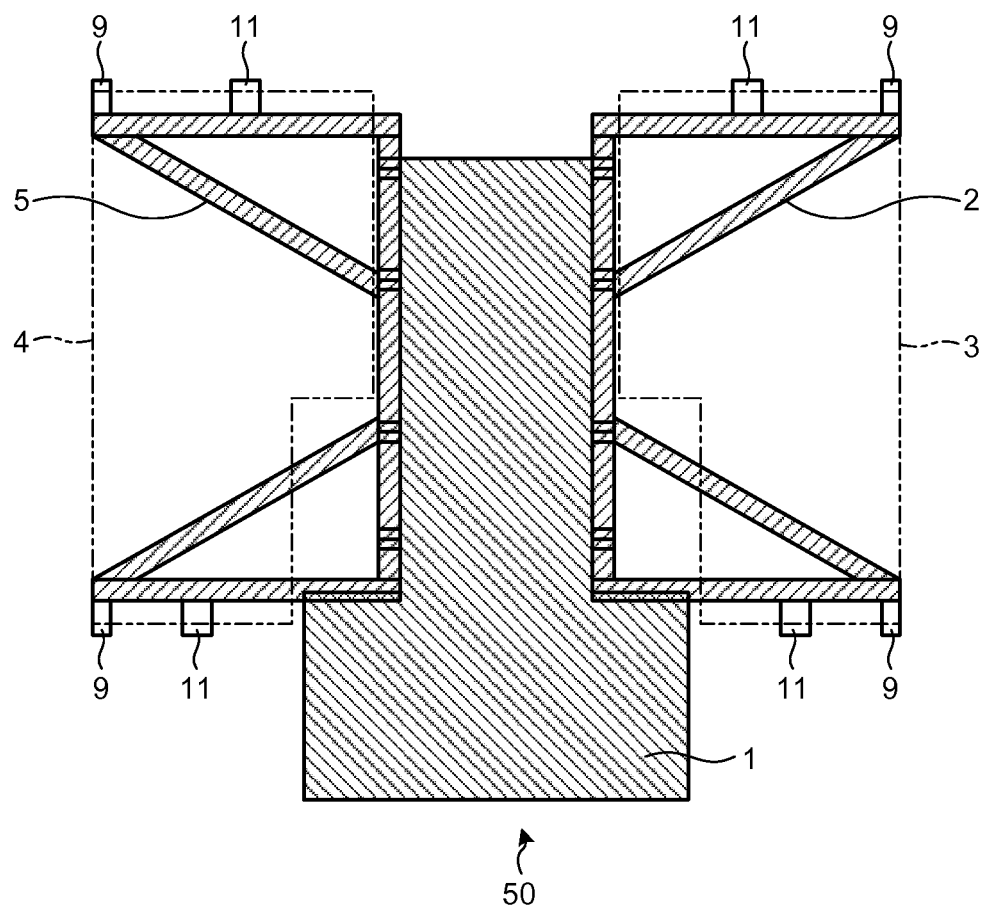
FIG. 5 is a top view of an example of another configuration of the machine tool.

FIG. 4 is a perspective view of an example of another configuration of the machine tool 50. FIG. 5 is a top view of an example of another configuration of the machine tool 50. In FIG. 5, only a lower portion of the machine tool 50 is shown. As shown in FIGS. 4 and 5, it is possible to provide a fixing position 9 at the time of transporting to the frames 2 and 5 such that, when the machine tool is transported, the machining fluid tanks 3 and 4 can be fixed to a pallet (not shown) or the like. Because the machining fluid tanks 3 and 4 are fixed through the frames 2 and 5, by fixing the fixing position 9 to a transport pallet, it becomes unnecessary to fix the machining fluid tanks 3 and 4 directly to the transport pallet at the time of transporting.

Figure 6:
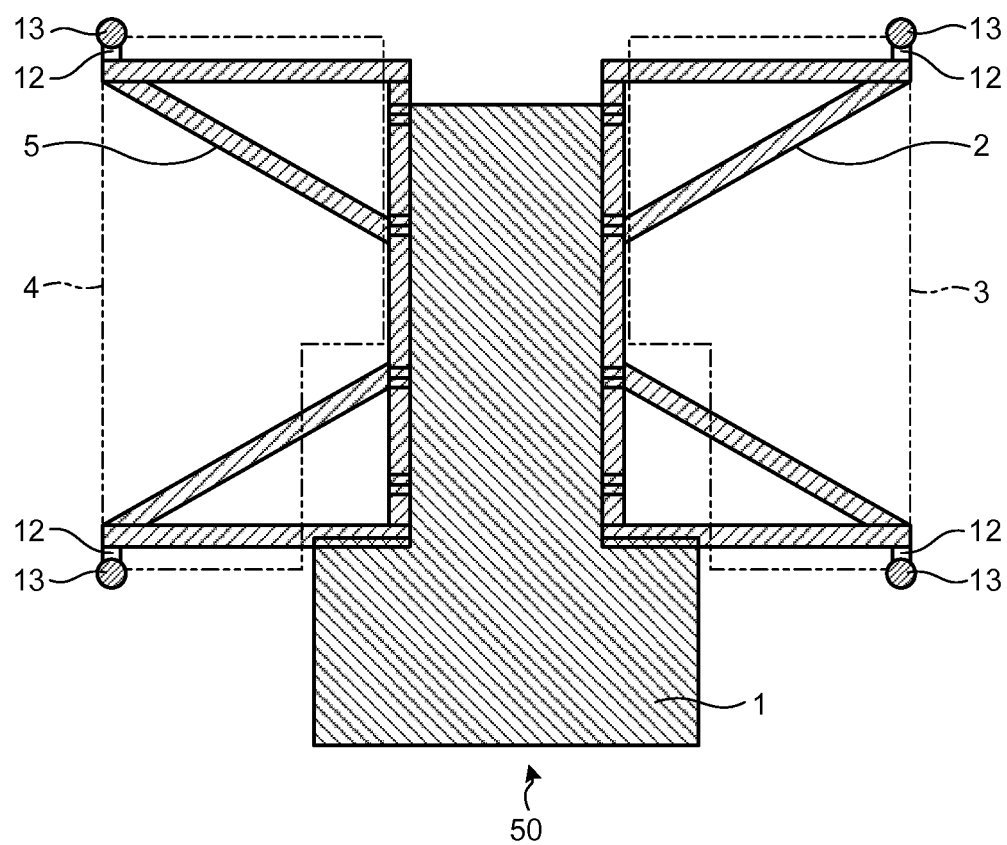
FIG. 6 is a top view of the example of another configuration of the machine tool.

FIG. 6 is a top view of the example of another configuration of the machine tool. In FIG. 6, only a lower portion of the machine tool 50 is shown. As shown in FIG. 6, at the time of moving or the like, in order to secure the weight balance when the machining fluid tanks 3 and 4 having fluid filled therein are mounted on the frames 2 and 5, it is possible to provide a leveling position 12 for attaching a leveling member 13 to the frames 2 and 5. By attaching the leveling position 12 to the frames 2 and 5, even when only one of the machining fluid tanks 3 and 4 having fluid filled therein is mounted on the corresponding one of frames 2 and 5, it is possible to prevent the machine tool 50 from inclining. A publicly known member such as a leveling foot can be employed as the leveling member 13. Furthermore, leveling (adjustment of inclination) of the frames 2 and 5 can be performed by attaching a bolt to the leveling position 12 so as to project downward and changing the projecting amount of the bolt. It is also possible to configure such that the leveling position 12 and the fixing position 9 have the same structure so that these positions can be commonly utilized for the time of fixing the machining fluid tanks 3 and 4 to a pallet and for the time of fixing the leveling member 13 to the frames 2 and 5.

In this manner, according to the present embodiment, by fixing the frames 2 and 5 having a sufficient rigidity to a side surface of the bed 1 of the machine tool 50, large-sized units such as the machining fluid tanks 3 and 4 can be made an integrated structure at the time of transporting. Furthermore, at the time of installing the machine tool 50, these large-sized units can be separated from the machine main body 30, and thus it is possible to employ a configuration such that a sufficient rigidity of the bed 1 can be secured. Further, as the frames 2 and 5 are left to be fixed to a side surface of the bed 1 after the installation, the frames 2 and 5 having a sufficient rigidity function as structural bodies, so that the rigidity of the bed 1 with respect to twisting can be increased.

In the present embodiment, while an example in which the present invention is an electric-discharge machining device that machines a workpiece by an electric-discharge machining method has been explained, the present invention is not limited to an electric-discharge machining device, and other types of machines with various machining methods such as a grinding work machine and a cutting work machine can be also applied to the present invention, and the invention is not limited to machines of any specific machining methods. Furthermore, because an electric-discharge machining device has been exemplified, its accompanying devices have been explained as machining fluid tanks; however, these accompanying devices can be any devices according to a certain machining method, and these devices can be, for example, a chiller, a cooling device, a tank of projection materials for blast processing.

Further, in the present embodiment, while a frame is fixed to both side surfaces of a bed, it is also possible to configure such that a frame is fixed to only one side surface.

INDUSTRIAL APPLICABILITY

As described above, the machine tool according to the present invention is useful in a feature that, with respect to a machine tool that requires large-sized units as its accompanying devices, the large-sized units are transported while these units are integrated with a bed and these units are separated at the time of installation, and the machine tool is particularly suitable for a machine tool such as an electric-discharge machining device, that requires large units such as machining fluid tanks.

REFERENCE SIGNS LIST

| | |
|---|---|
| 1 | bed |
| 2, 5 | frame |
| 3, 4 | machining fluid tank |
| 6 | lower surface position |
| 7 | bottom surface |
| 8 | leg |
| 9 | fixing position |
| 10 | fixing part |
| 11 | transport fixing tool |
| 12 | leveling position |
| 13 | leveling member |
| 14 | space |
| 15 | mounting surface |
| 20 | electric-discharge machining unit |
| 20a | machining tank |
| 20b | column |
| 30 | machine main body |
| 50 | machine tool |

The invention claimed is:

1. An electric-discharge machining device comprising:
a bed;
an electric-discharge machining unit that is mounted on the bed and constitutes a machine main body with the bed;
a frame that has a mounting surface and is fixed to a side surface of the bed;
machining fluid tanks that are used when the electric-discharge machining unit performs a machining work, and are set to the first state where these tanks are above the frame and physically separated from the frame so as to be self-supported at their positions or to the second state where these tanks are mounted on the mounting surface;
a fixing member that is attachable and fixes the machining fluid tanks mounted on the mounting surface of the frame to the frame, wherein
when the electric-discharge machining unit is operated, the machining fluid tanks are set to the first state by removing the fixing member, and
when the machine main body and the machining fluid tanks are moved, the machining fluid tanks are set to the second state by attaching the fixing member.

2. The electric-discharge machining device according to claim 1, wherein the frame is fixed to the bed such that a lower surface of the frame is arranged at a position higher than a lower surface of the bed.

3. The electric-discharge machining device according to claim 1, wherein the frame has a space, in which no structural member that constitutes the frame is provided, near the central part at a side opposite to the side on which the frame is fixed to the bed.

4. The electric-discharge machining device according to claim 1, wherein a leveling member that adjusts inclination of the frame is attachable to the frame.

* * * * *